Patented Mar. 4, 1930

1,749,665

UNITED STATES PATENT OFFICE

CHARLES B. DILTZ, OF FROST, TEXAS

CONSERVING STORAGE-BATTERY SOLUTION

No Drawing.   Application filed February 4, 1927. Serial No. 166,026.

This invention relates to a storage battery solution, the object being to provide a type of solution which will conserve the life of the plates and prevent the accumulation of lead sulphate on the surface, thus not only assisting a prolongation of useful life of the battery, but permitting a more efficient action in storage of electric energy and delivery in an external circuit. Sulphuric acid is commonly employed as the electrolyte of the acid type of storage batteries. The life of the plate may be greatly prolonged by a modification of the electrolyte. I have discovered that a certain combination of salts and acids have a remarkably beneficial effect in preventing the formation of lead sulphate which gradually in the use of the battery accumulates and limits or destroys its efficiency.

The solution I have found most efficient for combining with the sulphated water commonly employed is composed of a mixture of sodium carbonate, sodium silicate, boric acid, tartaric acid, and carminic acid. The latter ingredient has not only a pleasing distinctive effect in coloring the solution, but has a definite reaction with the lead products of the plate to handicap the development of insoluble lead sulphate and assist the formation of peroxide in recharging the battery. In forming the solution I prefer to make a 1.25 solution of sulphuric acid in one gallon of distilled water, to which I add ¼ lb. of sodium carbonate, 2 ozs. of sodium silicate, 1½ oz. each of boric acid and tartaric acid, and 1 oz. of carminic acid. In preparing the mixture I first prepare a 1.25 specific gravity solution of sulphuric acid in distilled water, to which I add the ¼ lb. of sodium carbonate and the 1½ oz. each of boric acid and tartaric acid. The 2 ozs. of silicate diluted with a pint of hot water is then added to the carmine and stirred into the compound solution. This composite solution will not only bring old batteries up after being cleaned up and treated with my solution, but will preserve the plates and prevent them from deteriorating by sulphating, as well as permit them to act with higher overall efficiency in conversion of electric energy, as they not only prevent corrosion and excessive formation of sulphate but they limit evaporation, as the precipitated silica is in mulsified form which does not materially damage internal resistance of the battery, but prevents slopping of liquid to a material extent in transportation and tends to form a crust on the top to retard evaporation.

The compound I have discussed above is one at which I have arrived after a long period of experimenting and have discovered to be very effective for the purposes above noted. I am not clear in every respect as to the reactions which go on in promoting the beneficial results. The sodium carbonate reaction in combining with the preliminary acid solution produces a violent effervescence which tends to dislodge some portion of the sulphate detritus which clogs the action of the battery, and the boric, tartaric and carminic acids form a reaction with the lead and, as I believe, also with its sulphated products to form clean compounds of lead, or oxide of lead, which readily peroxidize under the influence of a charging current permitting a better charging action. They undoubtedly raise somewhat the internal resistance of the battery but not to a sufficient degree to antagonize the beneficial effect in other respects. The sodium silicate, moreover, tends to form a gelatinous mass which retards loss from handling and slopping over and permits better action of the entire electrolyte by the reactions formed of the several forms of sodium salts liberated by the sulphuric and other acids.

While I have given certain proportions of these compounds as proving of high efficiency, the proportions of their relative use may be modified within reasonable limits without interfering materially with the effective action of the whole.

What I claim is:

A storage battery electrolyte containing a 1.25 solution in water of sulphuric acid to which has been added in each gallon ½ lb. of sodium carbonate, 1½ oz. of boric acid, 1½ oz. of tartaric acid, 1 oz. of carmine, and 2 ozs. of sodium silicate.

In testimony whereof I affix my signature.

CHARLES B. DILTZ.